(12) United States Patent
Maglica et al.

(10) Patent No.: US 8,833,964 B2
(45) Date of Patent: Sep. 16, 2014

(54) LED LUMINOUS ELEMENT FOR ILLUMINATING A LIGHT BOX HAVING HOMOGENEOUS LIGHT DISTRIBUTION

(75) Inventors: Jure Maglica, Ljubecna (SI); Christian Derkits, St. Michael (AT)

(73) Assignee: Tridonic Jennersdorf GmbH, Jennersdorf (AT)

( * ) Notice: Subject to any disclaimer, the term of this patent is extended or adjusted under 35 U.S.C. 154(b) by 176 days.

(21) Appl. No.: 13/496,407

(22) PCT Filed: Sep. 15, 2010

(86) PCT No.: PCT/EP2010/063532
§ 371 (c)(1),
(2), (4) Date: Apr. 13, 2012

(87) PCT Pub. No.: WO2011/032975
PCT Pub. Date: Mar. 24, 2011

(65) Prior Publication Data
US 2012/0188755 A1 Jul. 26, 2012

(30) Foreign Application Priority Data

Sep. 16, 2009 (DE) .................... 20 2009 012 572 U
Oct. 1, 2009 (DE) .................... 20 2009 013 230 U

(51) Int. Cl.
| | | |
|---|---|---|
| F21V 5/00 | (2006.01) | |
| G09F 13/22 | (2006.01) | |
| F21V 13/02 | (2006.01) | |
| F21V 13/12 | (2006.01) | |
| G06F 13/18 | (2006.01) | |
| G06F 13/16 | (2006.01) | |
| F21Y 103/00 | (2006.01) | |
| G09F 13/18 | (2006.01) | |
| F21S 4/00 | (2006.01) | |
| F21V 3/04 | (2006.01) | |
| F21V 5/04 | (2006.01) | |
| F21Y 101/02 | (2006.01) | |
| F21V 15/01 | (2006.01) | |

(52) U.S. Cl.
CPC ........... *F21V 13/02* (2013.01); *F21Y 2103/003* (2013.01); *G09F 2013/1831* (2013.01); *G09F 13/22* (2013.01); *F21S 4/003* (2013.01); *F21V 5/008* (2013.01); *F21V 3/04* (2013.01); *G06F 2013/1854* (2013.01); *F21S 4/008* (2013.01); *G09F 2013/222* (2013.01); *F21V 13/12* (2013.01); *G06F 13/18* (2013.01); *F21V 5/04* (2013.01); *F21Y 2101/02* (2013.01); *F21V 15/013* (2013.01); *G06F 13/16* (2013.01)
USPC ...... 362/217.02; 362/224; 362/225; 362/235; 362/244

(58) Field of Classification Search
USPC .................. 362/235, 244, 246, 249.02, 404, 362/249.01, 217.01, 219, 223, 224, 225, 362/217.02
See application file for complete search history.

(56) References Cited

U.S. PATENT DOCUMENTS

| | | | | | |
|---|---|---|---|---|---|
| 5,237,766 | A | * | 8/1993 | Mikolay | .......................... 40/564 |
| 5,428,912 | A | * | 7/1995 | Grondal et al. | ................. 40/570 |
| 5,842,297 | A | * | 12/1998 | Tung | ............................... 40/546 |
| 5,887,968 | A | * | 3/1999 | Logan | .......................... 362/241 |
| 5,950,340 | A | * | 9/1999 | Woo | ................................ 40/564 |
| 6,354,718 | B1 | * | 3/2002 | Iwaki et al. | .................... 362/351 |
| 6,481,130 | B1 | * | 11/2002 | Wu | ............................... 40/546 |
| 6,592,238 | B2 | * | 7/2003 | Cleaver et al. | ................. 362/246 |
| 6,874,924 | B1 | * | 4/2005 | Hulse et al. | .................... 362/551 |
| 7,008,097 | B1 | * | 3/2006 | Hulse | .............................. 362/546 |
| 7,162,821 | B2 | * | 1/2007 | Venkataraman et al. | ........ 40/541 |
| 8,322,883 | B2 | * | 12/2012 | Cleaver et al. | ............ 362/249.04 |
| 8,469,542 | B2 | * | 6/2013 | Zampini et al. | ................ 362/231 |
| 8,690,383 | B2 | * | 4/2014 | Zampini et al. | ................ 362/231 |
| 2009/0129054 | A1 | | 5/2009 | Meulenbelt | |
| 2011/0090682 | A1 | * | 4/2011 | Zheng et al. | ................... 362/218 |
| 2012/0002409 | A1 | * | 1/2012 | Donauer | ........................ 362/218 |
| 2012/0218746 | A1 | * | 8/2012 | Winton | .......................... 362/219 |

FOREIGN PATENT DOCUMENTS

| | | |
|---|---|---|
| WO | 03062700 A1 | 11/2004 |
| WO | 2006055873 A2 | 5/2006 |

OTHER PUBLICATIONS

International Preliminary Report on Patentability in connection to corresponding International Application No. PCT/EP2010/063532 on Mar. 20, 2012.

International Search Report issued in connection with the corresponding International Application No. PCT/EP2010/063532 on Jan. 17, 2011.

\* cited by examiner

*Primary Examiner* — John A Ward

(74) *Attorney, Agent, or Firm* — The H.T. Than Law Group

(57) ABSTRACT

The invention relates to an elongated luminous element (1) having a plurality of approximately point-shaped light sources (2) disposed along a line and having light diffusion means (3) deflecting at least one part of the light rays (12) sent out by the light sources (2) in a desired direction. The light diffusion means (3) are disposed lateral to the main emitting direction of the light sources. The elongated luminous element (1) is particularly suitable for installation in a light box (13) for advertising or demonstration purposes. The light box has a transparent or partially transparent front side (7) and a reflective back side (8). The elongated luminous element (1) or a plurality thereof is or are applied to at least one of the side areas (11, 14), such that the light rays (12) emitted by the light sources (2) and deflected by the light diffusing means (3) are aimed between or on the back side (8) and/or the front side (7) of the light box (13).

22 Claims, 3 Drawing Sheets

LED LUMINOUS ELEMENT FOR ILLUMINATING A LIGHT BOX HAVING HOMOGENEOUS LIGHT DISTRIBUTION

BACKGROUND OF THE INVENTION

The invention relates to an elongate luminaire element with a plurality of approximately punctiform light sources arranged along a line, such as can be used in particular, but not exclusively, for so-called light boxes which are backlit on one or two sides for advertising purposes.

Such an elongate luminaire element is known and is available on the market as "Philips Affinium LED posterbox module". In the known luminaire element, the light sources are formed by LEDs. The reflector means are rotationally symmetrical parabolic mirrors, which surround the individual LEDs. The LEDs with their rotationally symmetrical reflector mirrors are arranged at intervals along a line within a basic body, which has a U-shaped profile.

Luminaire elements of the above-described type are used, inter alia, in light boxes for advertising pictures. These light boxes have a transparent or partially transparent front side, on which the image to be backlit is located, and a reflecting rear side. The luminaire elements are fitted within the light box at the peripheral regions and thus radiate into the interspace between the front and rear sides. When using the known luminaire elements in a light box, the mounting plane of the LEDs runs perpendicular to the emission plane of the light box.

SUMMARY OF THE INVENTION

The invention is based on the object of developing an alternative to the known elongate luminaire element which is characterized by the resulting light distribution being more homogeneous.

The object is achieved by the features of the independent claims. The dependent claims develop the central concept of the invention in a particularly advantageous manner.

According to the invention, therefore, an elongate luminaire element has a plurality of preferably approximately punctiform light sources, in particular LEDs, arranged along a longitudinal direction. In this case, a lens is preferably arranged over each light source. This lens can cover a plurality of or all of the luminous means, with the result that the lens can be in the form of an approximately half-round bar. In this case, preferably planar, for example plate-shaped light diffusion means are arranged on one side or on both sides and parallel to the axis of symmetry of the light exit cone of the light sources. The light diffusion means are configured such that they act as diffuse radiators (approximately Lambertian radiators) on their rear side, i.e. the side remote from the light cone of the luminous means.

A plurality of planar light diffusion means, which can have the same or else different heights, can also be arranged on one or both sides.

Scattered particles can be provided in the light diffusion means.

The distance between the light diffusion means and the mid-axis of the light exit cone or the distance between said light diffusion means if they are provided on both sides, is selected in interaction with the height thereof such that the main cone of light, (FWHM) is directed past the light diffusion means, without any interaction therewith. Therefore, only the light outside the FWHM is scattered diffusely by the light diffusion means.

The diffuse scattering can in this case result in backscattering of some of the light in the opposite direction to the emission direction, but outside the light diffusion means.

Preferably, the light diffusion means form a first wall and a second wall, which extend tangentially to the main emission direction of the light sources.

Therefore, two continuous light diffusion means are formed which influence the light of all light sources. This results in a simple and at the same time effective design.

In this case, in a preferred embodiment the first wall and the second wall run along the longitudinal direction on two opposite sides of the punctiform light sources.

Instead of providing a dedicated rotationally symmetrical reflector mirror for each light source, as in the prior art, the solution according to the invention represents a simplification in that now only two continuous, wall-shaped light diffusion means are provided for all light sources.

Furthermore, the light diffusion means can have a structured surface. In addition, the light diffusion means and the lenses can be formed integrally. The light diffusion means and the lenses can be produced by means of an injection molding method, for example.

Preferably, the lens has a full width at half maximum (FWHM) which is no wider than 30°.

The light diffusion means can consist of glass or of a polymer. The lenses can also consist of glass or a polymer.

A further aspect relates to a second lens, which is arranged above the light diffusion means. This second lens focuses the light beam more narrowly. The second lens can be fitted, for example, at the peripheral edges of the light diffusion means and preferably at a defined distance from the first lens.

Owing to the narrower focusing of the beam, a central region of a light box, for example, therefore illuminates more homogeneously (in terms of the light intensity).

In a preferred embodiment, the light sources are fitted on a top-hat rail. This also acts as a heat sink (heat dissipation) and can consist, for example, of a metal material, for example aluminum. For this purpose, the top-hat rail can be provided with one or more cooling ribs.

The top-hat rail can also act as holder for the light diffusion means and have grooves for this purpose, for example.

The base of the top-hat rail is wider than the distance between the light diffusion means.

In addition, the invention relates to a light box, with a transparent or partially transparent front side, with a reflecting rear side and with at least one elongate luminaire element, which is fitted to at least one of the side regions. Such a light box is known, as described at the outset.

It is now proposed to equip the known light boxes with a backlit advertising surface at the periphery, i.e. at one peripheral edge or a plurality of peripheral edges, with the above-described elongate luminaire elements.

The partially transparent front side can in this case be formed by a diffuser disk.

By suitable selection of the light diffusion means it is now possible to deflect the light beams of the light sources in particular onto the reflecting rear side of the light box, with the result that the light beams are reflected by the rear side ultimately onto the transparent or partially transparent front side. Owing to the multiple reflections and scattering, the light intensity is largely homogeneous over the entire dimensions of the light box.

BRIEF DESCRIPTION OF THE DRAWINGS

Further properties, advantages and features will now be communicated to a person skilled in the art using the detailed description below relating to an exemplary embodiment and with reference to the figures in the attached drawings.

DETAILED DESCRIPTION OF THE INVENTION

Figure 1:
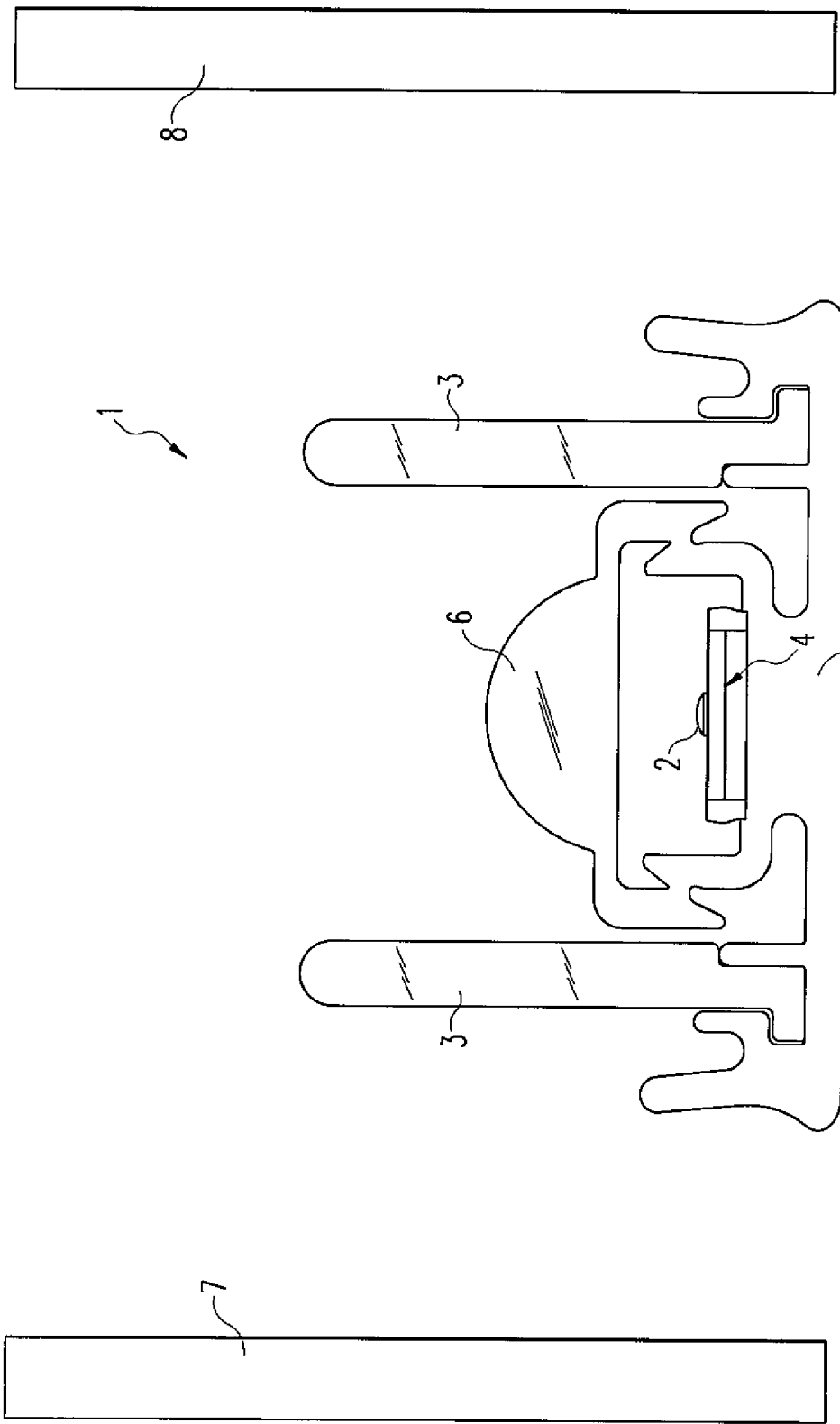
FIG. 1 shows a first embodiment of an elongate luminaire element according to the invention in a front view.

FIG. 1 shows a front view of the elongate luminaire element 1 according to the invention. Correspondingly, only one light source 2 is shown in this view. This light source is preferably one or more LEDs 2, which is/are fitted on one or more LED modules 4. For this purpose, various methods known from the prior art can be used, such as SMD (surface mounted device) or COB (chip on board).

Preferably, white LEDs, for example in the form of RGB modules and/or dye-converted LEDs, are used.

The LED module is fitted on a top-hat rail 5. This is in the form of a U-shaped rail, for example. The top-hat rail acts as mechanical base for the luminaire element 1. At the same time, the top-hat rail can also be used for heat dissipation by virtue of a thermally conducting connection to the LED module. An option in this regard is for the top-hat rail to consist at least partially of a metal such as aluminum, but possibly also partially of a polymer.

A lens 6 is located above the light sources. Said lens has, for example, a full width at half maximum (FWHM) of at most 30°. It is critical that the exit angle of the light source is focused by means of the lens 6.

The lens 6 can cover a plurality of or else all of the light sources. In particular in the latter case, it can have the form of a half-round bar.

In each case, light diffusion means 3 are located on the left and right (in a sectional view) of the light sources, inserted into grooves in the top-hat rail. Said light diffusion means each have the form of a wall. The two walls therefore form a corridor, which encloses the large number of light sources. The walls can be inserted into the top-hat rail 5, as shown in FIG. 1. It is also conceivable for them to be formed so as to be flush with the top-hat rail. The walls are at least partially transparent and have a light-scattering effect, for example owing to scattered particles which have been introduced in a transparent matrix. In this case, the walls can consist of glass or a polymer. It is also possible for the walls to be formed integrally with the lenses 6. For this purpose, it would be conceivable to use an injection molding method.

In each case, one wall 7 and 8 is located on the left and right of the elongate luminaire element 1. These walls are the front wall 7 and the rear wall 8 of the light box 13, which is shown in more detail in FIG. 3.

Figure 2:
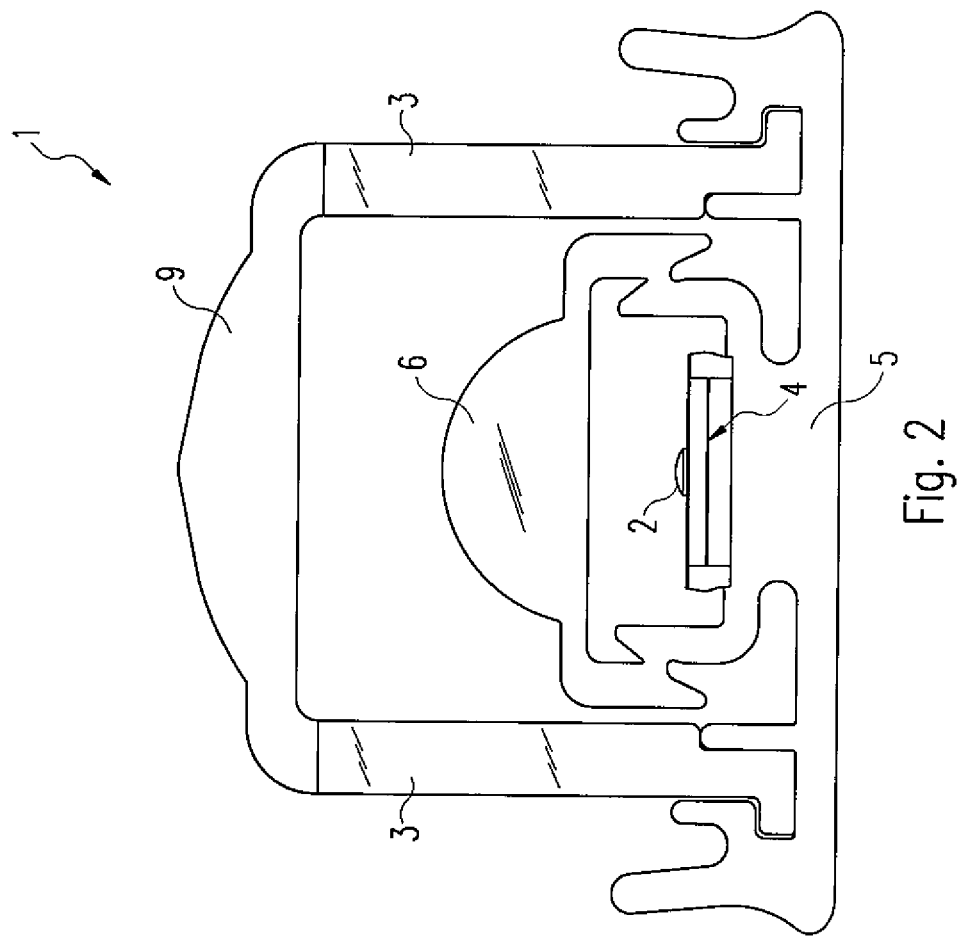
FIG. 2 shows a second embodiment of an elongate luminaire element according to the invention in a front view.

FIG. 2 shows a second embodiment according to the invention of the luminaire element 1. This corresponds to the first embodiment, but also has a second, additional lens 9. This additional lens can, as shown in FIG. 2, connect the two light diffusion means 3 and thus cover the lens 6. In this case, it is also conceivable for the two walls 3 and the lens 9 to be formed integrally and for the three parts therefore to form merely one element. It would also be conceivable for a plurality of lenses 9 to be capable of being plugged onto the walls 3. By virtue of the additional lens 9, the effect according to the invention can be intensified, for example by further intensified focusing of the emerging light.

The second lens 9 can also cover a plurality of or else all of the light sources.

Figure 3:
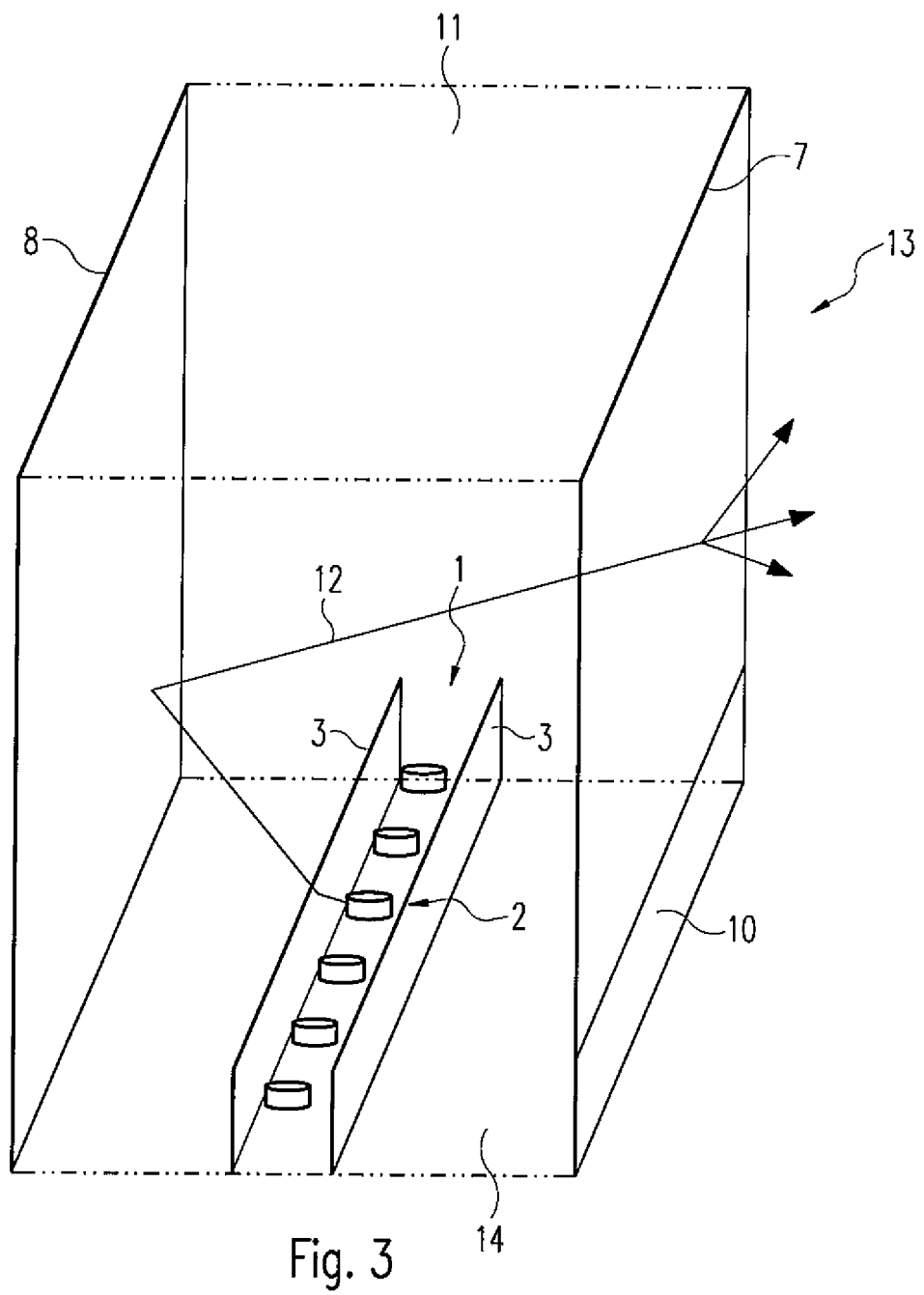
FIG. 3 shows a schematic view of a light box according to the invention.

FIG. 3 shows, schematically, a light box 7 with an elongate luminaire element 1. The light box has a relatively flat form, in contrast to the schematic illustration, such as for example a height of 150 cm, a width of 100 cm and a depth of merely 10 cm.

The light box has a base plate 14, a cover plate 11, with the two preferably being at least partially reflecting, a front side 7 and a rear side 8. In this case, the illuminated image, for example an advertising placard, is located on the front side 7 and has a size of 150 cm×100 cm, for example. The front side is transparent with embedded diffuser particles in order to cause the light passing through to also be scattered. The rear side 8 is at least partially reflecting, but can also have a scattering light reflection. The left and right sides (the front and rear sides in the view in FIG. 3) are also covered by plates, but this is not illustrated in any further detail graphically for reasons of ease of understanding.

It is conceivable for a cover to be located in the lower region of the front side 10 in order thus to hide the luminaire element 1 and possibly further electronics which are required for operating the light box. At the same time, the effect of a homogeneous light distribution on the front side 7 can be intensified by virtue of light emerging directly from the luminaire element being shaded. In this case, it is advantageous if the cover 10 on the inner side is at least partially reflecting.

The shading cover 10 is purely optional since this region is illuminated by the reflective effect of the diffuse scattering of the light diffusion means.

A luminaire element 1 is fitted on the base plate 14, with said luminaire element extending, as far as possible, over the entire width of the light box, for example having a length of 100 cm. In this case, the luminaire element is oriented such that the main exit direction of the emitted light is directed into the area between the front and rear walls. Therefore, a light distribution which is as uniform as possible over the entire area is achieved. In this case, the effect is intensified further by the light diffusion means 3 since said light diffusion means deflect the light which emerges laterally from the light sources directly in the direction of the front side 7 and therefore statistically results in a preference of a light path in the direction of the area between the front and rear sides and above the luminaire element.

In this case, the light beam 12 illustrates the effect according to the invention. The light beam emits laterally from a light source 2. Normally, the light beams would be reflected in a lower region of the rear side 8 and therefore also emerge in a lower region of the front side 7, as a result of which it would excessively intensify illumination in the lower region. However, the light beam is deflected by the left wall 3, i.e. the light diffusion means, in such a way that it is reflected approximately at the central height of the rear side 8 and thus emerges slightly above the center of the front side 7, i.e. at a random location. Owing to the scattering effects of the front side 7, the light beam is scattered additionally once again as it emerges.

In conclusion, it is noted that it is also conceivable to use two or more luminaire elements which are fitted on opposite sides. The base plate 14 (as shown in FIG. 3) and the cover plate 11, as well as the left-hand and the right-hand cover plate of the light box can be used for this purpose.

LIST OF FIGURES

1 Luminaire element
2 Light source
3 Light diffusion means
4 LED module
5 Top-hat rail 6 Lens
7 Front side
8 Rear side
9 Second lens
10 (Purely optional) shading cover
11 Cover plate
12 Light beam
13 Light box
14 Base plate

The invention claimed is:

1. An elongate luminaire element (1) with a plurality of approximately punctiform light sources (2) comprising LEDs arranged along a longitudinal direction, with a lens (6) which covers a plurality of or all of the light sources (2), wherein an exit angle of the light sources is focused by the lens, and one or more planar light diffusion means having a form of a wall (3), which extend in a longitudinal axis of the luminaire element (1) on one side or on both sides and parallel to an axis of symmetry of a light exit cone of the light sources (2).

2. The elongate luminaire element as claimed in claim 1, in which each light diffusion means (3) is configured to act as a diffuse radiator on a rear side, which is the side remote from the light exit cone of the light sources (2).

3. The elongate luminaire element as claimed in claim 1, in which the one or more planar light diffusion means include a plurality of planar light diffusion means (3), which have the same or else different heights, and the plurality of planar light diffusion means are arranged on one side or on both sides of the axis of symmetry of the light exit cone.

4. The elongate luminaire element as claimed in claim 1, wherein scattered particles are provided in at least one planar light diffusion means (3).

5. The elongate luminaire element as claimed in claim 3, wherein a distance between the plurality of light diffusion means (3) and a mid-axis of the light exit cone or a distance between the plurality of light diffusion means (3) when provided on both sides, is selected in interaction with the height thereof such that a main cone of light, expressed by a full width at half maximum, is directed past the plurality of planar light diffusion means (3), without any interaction therewith, and only light outside the full width at half maximum is scattered diffusely by the plurality of planar light diffusion means (3).

6. The elongate luminaire element as claimed in claim 1, wherein a diffuse scattering provided by the light diffusion means (3) results in backscattering of some of the light in an opposite direction to an emission direction, but outside the light diffusion means (3).

7. The elongate luminaire element (1) as claimed in claim 3, wherein the plurality of light diffusion means (3) form a first wall and a second wall, which extend tangentially to a main emission direction of the light sources (2).

8. The elongate luminaire element (1) as claimed in claim 7, characterized in that the first wall and the second wall run along the longitudinal direction on two opposite sides of the punctiform light sources (2).

9. The elongate luminaire element (1) as claimed in claim 1, characterized in that the one or more light diffusion means (3) have a structured surface.

10. The elongate luminaire element (1) as claimed in claim 1, characterized in that the one or more light diffusion means (3) and the lens (6) are formed integrally.

11. The elongate luminaire element (1) as claimed in claim 1, characterized in that the one or more light diffusion means (3) and the lens (6) are produced by an injection molding method.

12. The elongate luminaire element (1) as in claim 1, characterized in that the lens (6) has a full width at half maximum of less than or equal to 30°, wherein full width at half maximum relates to a main cone of light.

13. The elongate luminaire element (1) as claimed in claim 1, characterized in that the one or more planar light diffusion means (3) consist of glass or a polymer.

14. The elongate luminaire element (1) as claimed in claim 1, characterized in that a second lens (9) is arranged above the one or more planar light diffusion means (3).

15. The elongate luminaire element (1) as claimed in claim 1, characterized in that the light sources are fitted on a top-hat rail (5).

16. A light box (13), with a transparent or partially transparent front side (7), and with a reflecting rear side (8), having at least one elongate luminaire element (1) as claimed in claim 1, which is fitted peripherally on the light box (13).

17. The light box (13) as claimed in claim 16, characterized in that the partially transparent front side (7) is formed from a diffuser disc.

18. The elongate luminaire element (1) as claimed in claim 1, characterized in that the lens (6) is in the form of an approximately half-round bar.

19. The elongate luminaire element as claimed in claim 15, wherein the top-hat rail consists of aluminum and is a heat sink 20. The elongate luminaire element as claimed in claim 16, wherein the front side of the light box comprises embedded diffuser particles that cause light passing through the front side to be scattered.

21. The elongate luminaire element as claimed in claim 1, wherein at least one planar light diffusion means of the one or more planar light diffusion means comprises scattered particles disposed in a matrix to provide a light-scattering effect.

22. An elongate luminaire element (1) with a plurality of approximately point-like light sources (2), wherein the plurality of approximately point-like light sources comprise light emitting diodes arranged along a longitudinal direction, with a lens (6) which covers a plurality of or all of the light sources (2), wherein an exit angle of the light sources is focused by the lens, and one or more planar light diffusion means having a form of a wall (3), which extend in a longitudinal axis of the luminaire element (1) on one side or on both sides and parallel to an axis of symmetry of a light exit cone of the light sources (2).

* * * * *